(No Model.)
P. BARCLAY.
LUBRICATOR.
No. 268,169. Patented Nov. 28, 1882.
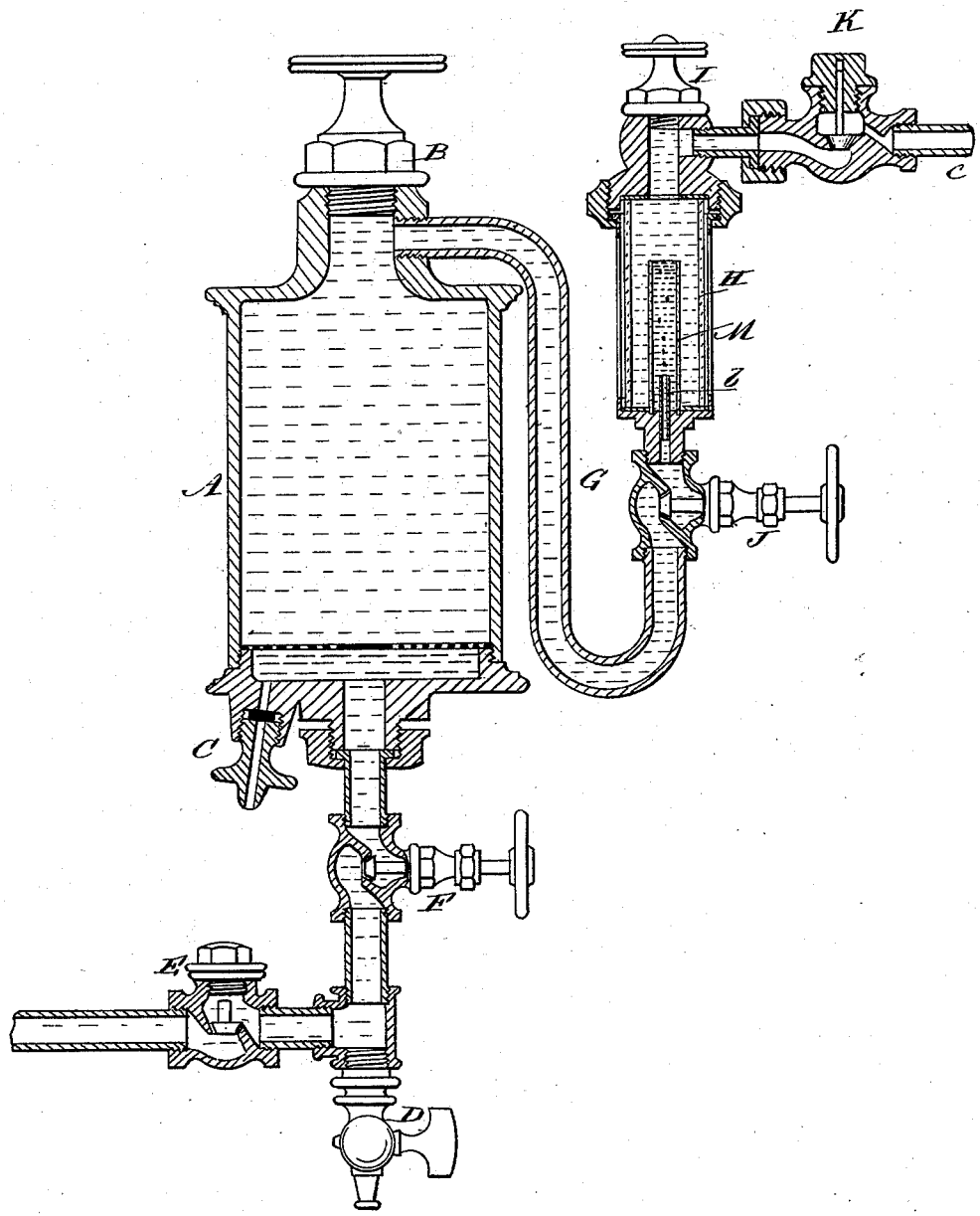
WITNESSES:
INVENTOR:
BY
ATTORNEYS.

UNITED STATES PATENT OFFICE.

PETER BARCLAY, OF EAST BOSTON, MASSACHUSETTS.

LUBRICATOR.

SPECIFICATION forming part of Letters Patent No. 268,169, dated November 28, 1882.

Application filed September 14, 1882. (No model.)

*To all whom it may concern:*

Be it known that I, PETER BARCLAY, of East Boston, Suffolk county, Massachusetts, have invented a new and useful Improvement in Lubricators, of which the following is a full, clear, and exact description.

This invention relates to lubricators for locomotive, marine, and other steam-engines in which the oil is supplied by the pressure of the steam, and is fed in a fine stream, or drop by drop, by its passage through a fluid medium of different specific gravity to it within a glass or glazed chamber, which admits of the amount of supply being seen and readily controlled as required.

The invention consists in an improvement upon such method of working a lubricator by delivering the oil from a cup or reservoir through a fluid of greater specific gravity than water, preferably an acidulous one, within a glass or glazed chamber, and discharging the same through a suitable outlet, whereby the transparency of the glass chamber is preserved and other advantages are obtained.

It also consists in certain combinations of parts in a lubricator of the description here referred to, whereby the operation is rendered more perfect and readily discernible.

Reference is to be had to the accompanying drawing, forming part of this specification.

The figure of the drawing represents a vertical sectional elevation of a lubricator embodying my invention.

In the accompanying drawing, A indicates the cup, having a perforated diaphragm, with solid center, near the bottom, by which a general pressure on the oil may be obtained without any condensing-tube in the cup, as in my improvement for which Letters Patent No. 223,092 were issued December 30, 1879. Attached to the cup A are a filling-cap, B, a cup-drain, C, a lower pipe-drain cock or valve, D, a check-valve, E, in the branch or pipe by which steam is admitted from the boiler, a hand-valve, F, for regulating the supply of steam to the cup, a pipe, G, for supplying oil from the cup to the indicator or receiver H through a small discharge-pipe, b, a cap, I, on the top of said receiver, a hand-regulating valve, J, and a check-valve, K, in the pipe c, which conveys the oil to the engine. This construction of the self-feeding oil-cup may be more or less varied; but the same will suffice to explain the nature or character of my invention. Heretofore in such construction, when the steam is up, the pipe-drain cock or valve D is opened till steam comes, then closed, the cap B removed to fill the oil-cup, the cap I removed to fill the indicator H (made of glass) with water, and the steam-valve F carefully opened to give the cup the necessary presure. After this the regulating-valve J is very carefully opened, which puts the lubricator in operation, the arrangement admitting of the engineer working the cup, say, one drop in two minutes and upward. In such method of working or supplying the oil drop by drop, visible from the exterior of or through the transparent indicator H, I have found that by supplying a liquid therein of greater specific gravity than water, preferably an acidulous liquid—such as vinegar, citric acid, acetic acid, and sulphuric acid—not only only is the same denser than pure water and the feed of the oil in drops therethrough more perfect, but that the glass of the indicator retains its transparency for a much longer period than can be obtained with water, the oil not settling on the glass to the same extent when an acidulous or other liquid of greater specific gravity than water—such as is before mentioned—is used. Consequently there is less necessity for frequent cleaning the glass of the indicator. Furthermore, instead of thus supplying the glass or glazed indicator H direct with the fluid medium of greater specific gravity than the oil, I arrange within said indicator H a glass or transparent tube, M, of about two thirds (more or less) in height of the outer glass tube of the indicator, and fill said inner tube, M, with the acidulous or other denser fluid medium, the small oil-discharge pipe b entering through the bottom or closed end of the tube or receptacle M, which is of suitable area to leave an oil-space around it within the outer glass or glazed tube of the indicator. By this arrangement the outer glass or glazed tube of the indicator H will simply contain oil, while the inner smaller transparent tube, M, will contain the acidulous or other denser fluid medium, and a good working capacity for the oil is obtained without interfering with the transparency of the indicator or its ability to expose the feed of the oil, drop by drop, from any or every side of the indicator, the tube M keeping the supply of oil central, or thereabout, within the indicator, and by its transparency admitting of a ready inspection.

Having thus described my invention, I claim as new and desire to secure by Letters Patent—

1. The method, substantially as herein described, of feeding oil, consisting in passing it through a fluid medium of different specific gravity than said oil, delivering the oil from a cup or reservoir through a body of acidulous or other liquid of greater specific gravity than water within a glass or glazed chamber, and discharging the same through a suitable outlet to the part or parts to be lubricated, essentially as herein set forth.

2. In a lubricator in which the oil is fed by passing it through a fluid medium of greater specific gravity than said oil, the combination, with an outer glass or glazed indicator-tube, forming a receptacle for the water, of an inner transparent tube, arranged to project up within said outer tube, and serving to contain within it the denser fluid medium, also to receive the oil in small or detached quantities up through it, substantially as specified.

3. In a lubricator constructed to operate by drop-feed, substantially as described, the combination of the inner transparent acidulous-liquid tube, M, the oil-discharge pipe $b$, and the outer transparent or glazed tube of the indicator H, essentially as and for the purpose herein described.

PETER BARCLAY.

Witnesses:
NATHANIEL SEAVER,
ANDREW P. FISHER.